US005386167A

United States Patent [19]

Strobi

[11] Patent Number: 5,386,167

[45] Date of Patent: Jan. 31, 1995

[54] PLANAR CARBON SEGMENT COMMUTATOR

[75] Inventor: Georg Strobi, Stuttgart, Germany

[73] Assignee: Johnson Electric S.A., Switzerland

[21] Appl. No.: 106,087

[22] Filed: Aug. 13, 1993

[30] Foreign Application Priority Data

Aug. 14, 1992 [GB] United Kingdom ................. 9217259

[51] Int. Cl.$^{6}$ ................................................ H02K 13/04

[52] U.S. Cl. .................................... 310/237; 310/233; 310/235

[58] Field of Search .................. 310/233, 42, 233, 44, 310/234, 235; 29/597

[56] References Cited

U.S. PATENT DOCUMENTS 5,157,299 10/1992 Gerlach .............................. 310/237
5,245,240 9/1993 Takasaki ............................. 310/237
5,255,426 10/1993 Farago ................................ 29/597

FOREIGN PATENT DOCUMENTS 0523649 7/1992 European Pat. Off. .
8907045 6/1989 Germany .
8908077 11/1989 Germany .
4026951 8/1990 Germany .
9006538 8/1990 Germany .
9006782 8/1990 Germany .
1067963 1/1965 United Kingdom .
2032196 4/1980 United Kingdom ................ 310/237
2247994 3/1992 United Kingdom .
9201321 1/1992 WIPO .

*Primary Examiner*—R. Skudy
*Attorney, Agent, or Firm*—Ostrolenk, Faber, Gerb & Soffen

[57] ABSTRACT

A planar carbon segment commutator has contact members, with terminals, attached to the front surface of an insulating base member by means of overmoulded carbon segments formed integral with anchor pieces disposed within apertures in the base member. Each aperture has a second part disposed rearwardly of a first part having a smaller cross-section than the second part and the anchor piece disposed within the aperture has a locking portion which fills the second part of the aperture to thereby resist withdrawal of the anchor piece from the aperture. The contact members are embedded in the carbon segments and have holes filled with carbon segment material to increase interlocking between the contact members and the segments.

9 Claims, 3 Drawing Sheets

FIG.2
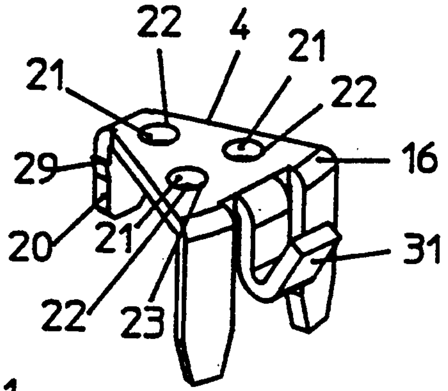
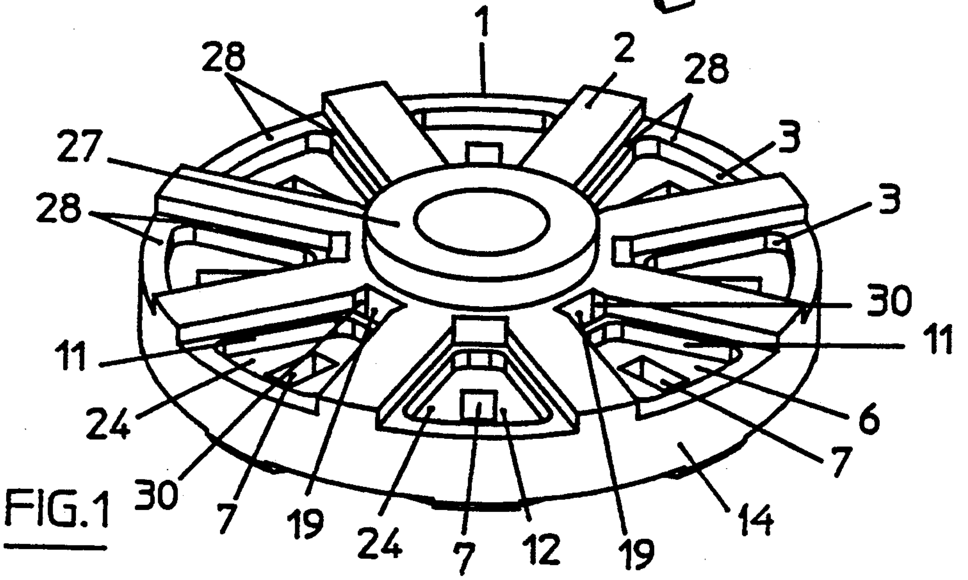
FIG.1
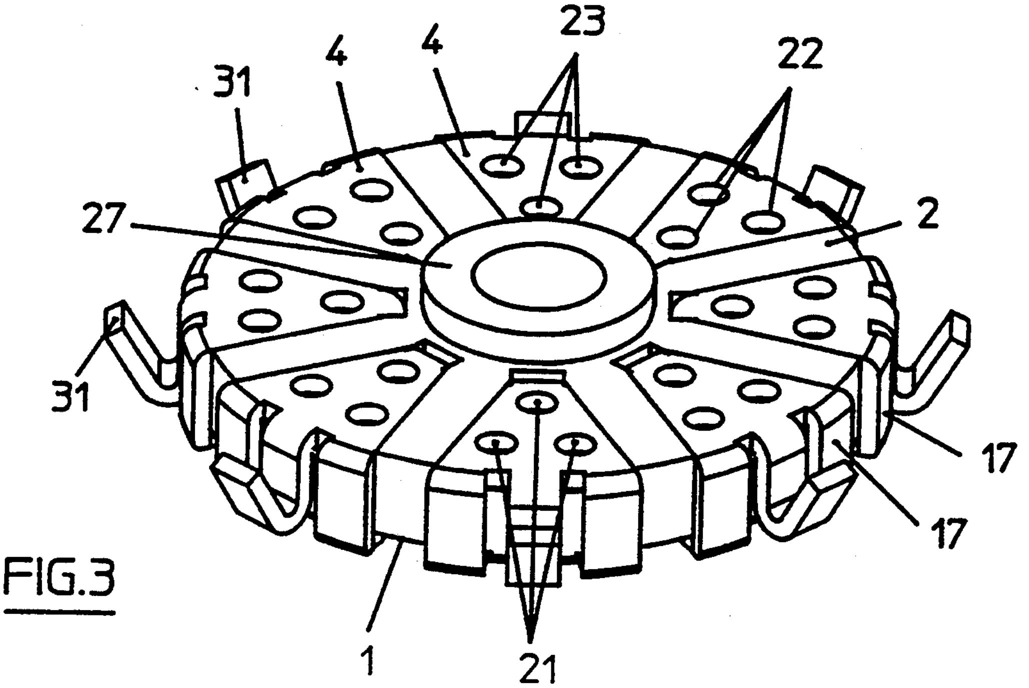
FIG.3

PLANAR CARBON SEGMENT COMMUTATOR

FIELD OF THE INVENTION

The invention relates to a planar or faceplate commutator in which the contact brushes bear axially against planar contact surfaces of the commutator, instead of bearing radially as in the case of a cylindrical commutator, and in which the contact surfaces are provided by a plurality of segments (normally arranged in an annular ring) having carbon outer layers for engagement with the contact brushes.

BACKGROUND ART

One known planar carbon segment commutator, disclosed in the specification of German Utility Model G 89 07 045.3, in the joint names of Deutsche Carbone AG and Robert Bosch GmbH, comprises a base member of insulating material having a rotational axis, a front surface extending, at least in part, transversely to the rotational axis, and a plurality of apertures extending rearwardly from the front surface; a plurality of circumferentially spaced contact members mounted on the front surface; and a plurality of circumferentially spaced overmolded carbon segments respectively formed on the contact members and each having integral anchor means which extend rearwardly into said apertures.

Although the anchor means provide some radial support for the carbon segments mounted on the contact member, against centrifugal force, and some support against axial withdrawal from the contact member, this support is dependent upon the shear strength of the carbon in the anchor means and on the frictional engagement between the anchor means and the apertures in which they extend. Therefore, to ensure adequate radial and axial support for the contact members and the carbon segments, the contact members have to be provided with rearward extensions insert molded into the front surface of the base member and undercut recesses for receiving integral rear portions of the overmolded carbon segments. This involves relatively complex and time-consuming forming and pre-assembly operations. Moreover, the resultant products are not particularly robust.

DISCLOSURE OF THE INVENTION

The purpose of the present invention is to provide a planar carbon segment commutator which, at least to some extent, avoids the disadvantages of known planar carbon segment commutators and to provide a planar carbon segment commutator in which the carbon segments are more firmly secured to the base member and help to fasten the other components of the commutator.

This is achieved by providing a commutator in which each carbon segment is aligned with at least one aperture; at least one aperture aligned with each segment is provided with a first part and, rearwardly of the first part, with a second part having an abutment surface laterally offset from the first part; and the anchor means extending into said one aperture have locking means disposed within the second part of the aperture and engaging the abutment surface to thereby resist axial withdrawal of the anchor means from the aperture.

Thus, according to the invention, there is provided a planar carbon segment commutator for an electric motor, comprising a base member of insulating material having a rotational axis, a front surface extending, at least in part, transversely to the rotational axis, and a plurality of apertures extending rearwardly from the front surface and each provided with a first part and, rearwardly of the first part, with a second part having an abutment surface laterally offset from the first part; a plurality of circumferentially spaced contact members mounted on the front surface; and a plurality of circumferentially spaced overmolded carbon segments, respectively formed on the contact members, each aligned with at least one aperture and each having integral anchor means which extend rearwardly into said one aperture and have locking means disposed within the second part of the aperture and engaging the abutment surface to thereby resist axial withdrawal of the anchor means from the aperture.

The invention also provides a method of manufacturing a planar carbon segment commutator for an electric motor, comprising the steps of providing a base member of insulating material having rotational axis and a front surface extending, at least in part, transversely to the rotational axis; forming the base member with a plurality of rearwardly extending apertures, including at least one aperture which is aligned with each segment and is provided with a first part and, rearwardly of the first part, with a second part having an abutment surface laterally offset from the first part; mounting a plurality of circumferentially spaced contact members on the front surface; and overmolding a plurality of circumferentially spaced carbon segments respectively on the contact members so that each segment has integral anchor means which extend rearwardly into said apertures, and include anchor means, extending into the apertures provided with the first and second parts, which are provided with locking means disposed within the second parts and engaging the abutment surfaces to thereby resist axial withdrawal of the anchor means from the apertures.

A single layer of carbon is preferably overmolded on the front surface of the base member and then divided into said segments by cutting radial grooves which pass through the single layer into the base member.

Thus, when the contact members have been mounted on the base member, a mold is fitted to the base member, the rear ends of the apertures are closed and a moldable mixture of carbon powder and carrier material is injected into the space between the base member and the mould. This ensures that the moldable mixture fills those parts of the apertures which are not occupied by the contact members. Any known carrier material, such as phenolic resin, may be used with the carbon powder to form the moldable mixture, but the choice of carrier material and any subsequent heat treatment will depend on the operating requirements of different commutators, in accordance with known technology which forms no part of the present invention.

Where two anchor means extend rearwardly from a carbon segment, each may be of uniform cross-section provided the two anchor means extend along non-parallel axes. Even when the first of two anchor means extend along an axis parallel with the rotational axis of the base member, the second, non-parallel anchor means will extend into a uniform cross-section aperture having a first part, a second part rearwardly of the first part, and an abutment surface laterally offset from the first part and the second anchor means will have locking means disposed within the second part of the aperture which engage the abutment surface provided by the second part of this aperture to thereby resist axial separation of the carbon segment from the base member. Similarly, because the first of the anchor means extend parallel to the rotational axis of the base member, this first anchor means will resist non-axial separation of the carbon segment from the base member.

An analogous locking effect is also obtained when both anchor means extend rearwardly along non-parallel axes which are also both non-parallel to the rotational axis of the base member.

However, in preferred embodiments of the invention, at least one (and, for ease of manufacture, preferably each) aperture formed in the base member has a second part of greater cross-section than its first part, and the anchor means integral with at least one (and, for ease of manufacture, preferably each) overmolded carbon segment comprise a single anchor piece which extends into one of these undercut apertures. Both the apertures and the anchor pieces may extend parallel to the rotational axis.

Each such undercut aperture may be frusto-conical in shape, in which case the rearward end of the inner surface of the aperture provides the abutment surface of the second part of the aperture. However, in a preferred form of commutator according to the invention, each undercut aperture formed with first and second parts has an internal bounding surface extending around the periphery of the aperture; at least one portion of said aperture bounding surface defines an inwardly directed, peripherally extending projection; and the locking means of the anchor piece extending into the aperture may comprise a locking portion having an edge disposed rearwardly of and in axial abutment with the peripherally extending projection. This provides a more positive axial attachment of each segment and contact member to the base member.

Advantageously, the base member has side and rear surfaces, each contact member has a radially outer part and at least one gripping part, and each gripping part has a first portion extending rearwardly from the radially outer part of the contact member, along the side surface of the base member, and a second portion extending radially inwards from the first portion, along the rear surface of the base member, to secure the contact member axially to the base member. Moreover, each contact member may have two such gripping parts on opposite sides of a terminal extending from the radially outer part of the contact member.

To provide additional or alternative means of positioning the contact members relative to the base member, prior to overmolding, the base member is formed with a plurality of axial recesses, each contact member has at least one rearwardly extending locating portion, and the locating portions are respectively disposed within said axial recesses. Moreover, the locating portions may be formed with barbs which engage inner surfaces of the axial recesses to thereby resist axial withdrawal of the locating portions from the axial recesses. This not only helps secure the contact members to the base member in the final assembly, it also ensures that the contact members are firmly located on the base member during the overmolding process when a moldable mixture of carbon powder and carrier material is applied to the base member and the contact members.

Preferably, each contact member has at least one abutment surface facing away from the rotational axis and engaging the carbon segment formed on the contact member to resist radial outward movement of the contact member and, conveniently, each contact member is formed with at least one hole having a internal bounding surface and part of said bounding surface constitutes the abutment surface.

In this case, each aperture preferably has a third part disposed forwardly of the first part and having a cross-section which fully overlaps each hole formed in the contact member engaging the carbon segment having the anchor piece extending into the aperture. This ensures maximum radial interlocking between the overmolded carbon and the contact members.

An embodiment of invention and its method of manufacture are hereinafter described, by way of example, with reference to the accompanying drawings.

BRIEF DESCRIPTION OF THE DRAWINGS

FIGS. 1 and 2 are perspective views, respectively, of a base member and a contact member forming part of a planar carbon segment commutator according to the invention;

FIG. 3 is a perspective view of a sub-assembly comprising a base member, as shown in FIG. 1, fitted with a plurality of a contact members, as shown in FIG. 2;

BEST MODES OF CARRYING OUT THE INVENTION

Figure 7:
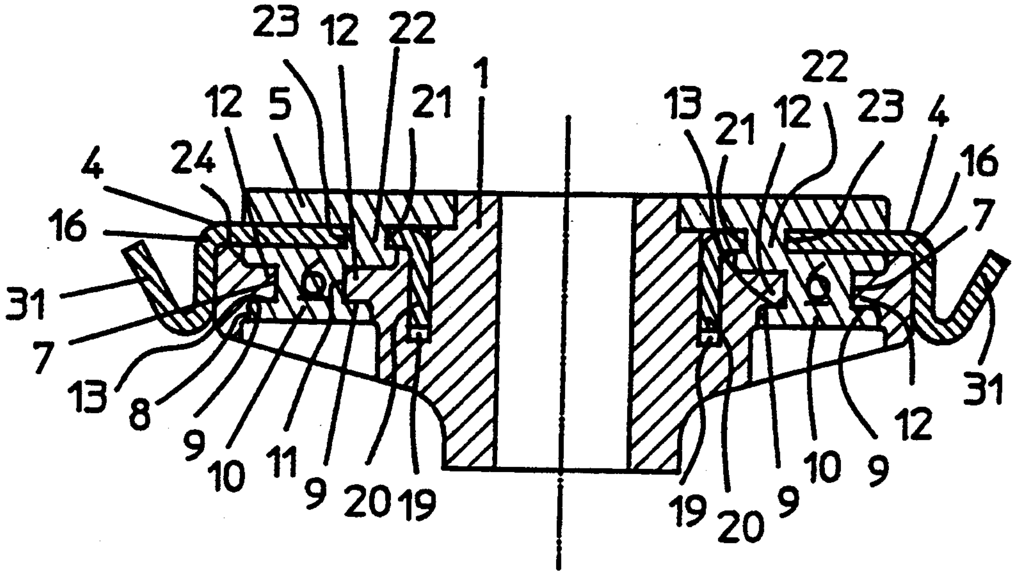
FIG. 7 is a sectional side elevational of the commutator shown in FIGS. 5 and 6.

A circular base member 1, as shown in FIGS. 1, 3 and 7, has a rotational axis and a front surface including a central annular ring 27, radial strips 2 and support surfaces 28, perpendicular to the axis. The strips 2 are disposed between circumferentially spaced apertures 3 which each comprise a central first part 7 and second and third parts 8 and 24 (FIG. 7) respectively, disposed rearwards and forwards of the first part 7.

As shown in FIGS. 1 and 7, each aperture 3 has a bounding surface 11 defined by an inwardly directed peripherally extending projection 12 which ensures that the second and third parts 8 and 24 of each aperture 3 have greater cross-sectional areas than the first part 7.

Support surfaces 28, (FIG. 1) forming part of the front surface of the base member, 1 are provided around the apertures 3 for supporting contact members 4, (FIG. 2) as shown in FIG. 3, Axial recesses 19 are formed in the base member 1 to receive locating portions 20 (FIG. 2) provided at the radially inner extremity of each contact member 4. Barbs 29 on the locating portions 20 engage with internal surfaces 30 of the axial recesses 19 to resist withdrawal of the locating portions 20 from the axial recesses 19.

Figure 6:
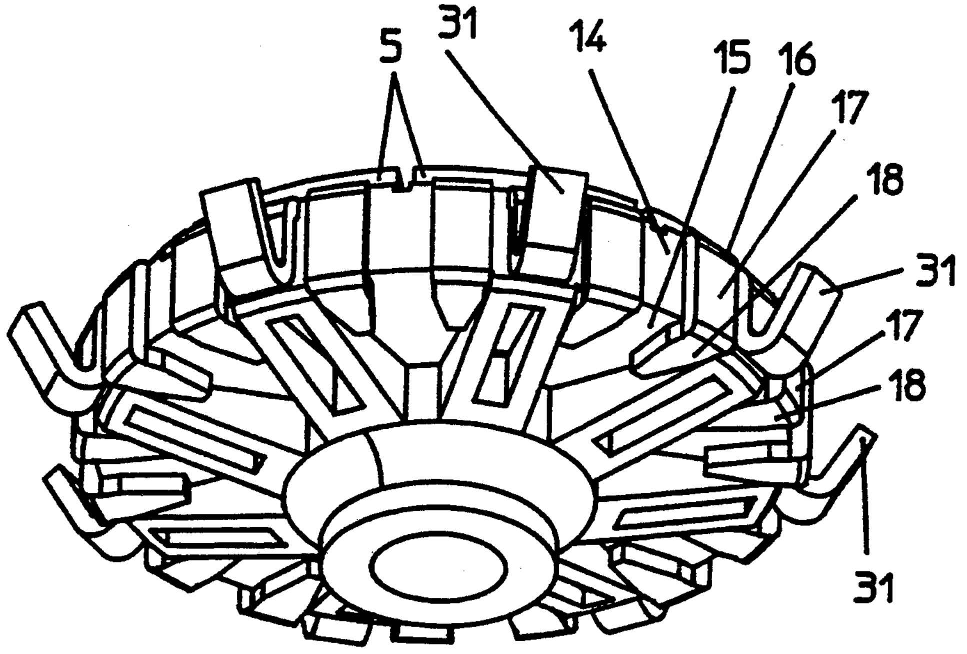

A terminal 31 extends from the radially outer edge 16 of each contact member 4 for attachment of an armature lead. Two fingers (unnumbered) extend from the radially outer edge 16 of each contact member 4, on opposite sides of the terminal 31, to form gripping parts for securing the contact member 4 axially to the base member 1. As shown in FIG. 6, each gripping part has a first portion 17 extending rearwardly from the radially outer edge 16 of the contact member 4, along a side surface 14 of the base member 1, and a second portion 18 extending radially inwards from the first portion 17, along a rear surface 15 of the base member 1.

When all the contact members 4 are mounted in position on the base member 1, as shown in FIG. 3, the sub-assembly is placed in a mold (not shown) defining an annular cavity surrounding the central annular ring 27 and the second parts 8 of the apertures 3 in the base member 1 are blanked off on the rearward side of the base member 1. A moldable mixture of carbon powder and carrier material, such as phenolic resin, is then injected into the annular mold cavity. This injected material flows through holes 22 formed in the contact members 4 and fills the apertures 3 in the base member 1 to form integral anchor pieces 6.

As shown in FIG. 7, the rearmost end of each anchor piece 6 forms a locking portion 10 disposed within the second part 8 of the aperture 3 in which the anchor piece 6 is disposed and has an edge 13 disposed rearwardly inwardly of and in axial abutment with an abutment surface 9 provided by the peripherally extending projection 12 to thereby secure the anchor piece 6 against axial withdrawal from the aperture 3.

As shown in FIGS. 3 and 7, the contact members 4 are each formed with three holes 22 having internal bounding surfaces 23. The radially inner portion of each of these bounding surfaces 23 therefore faces away from the rotational axis of the commutator and serves as an abutment surface 21 which engages the carbon forming segment 5 enclosing the contact member 4 thereby to resist (prevent) outward radial movement of the contact member 4 relative to the segment 5. Similarly, to the extent that each contact member 4 is otherwise attached to the base member 1, for example, by means of the locating portion 20, the radially outer portion of the bounding surface 23 of each aperture 22 abuts the carbon forming the segment 5 enclosing the contact member 4 to thereby-prevent outward radial movement of the segment 5 relative to the contact member 4.

This interlocking of the carbon with the contact members 4 is enhanced by ensuring that the cross-section of the third part 24 of each aperture 3 is large enough to encompass fully all of the holes 22 in the adjacent contact member 4.

Figure 4:
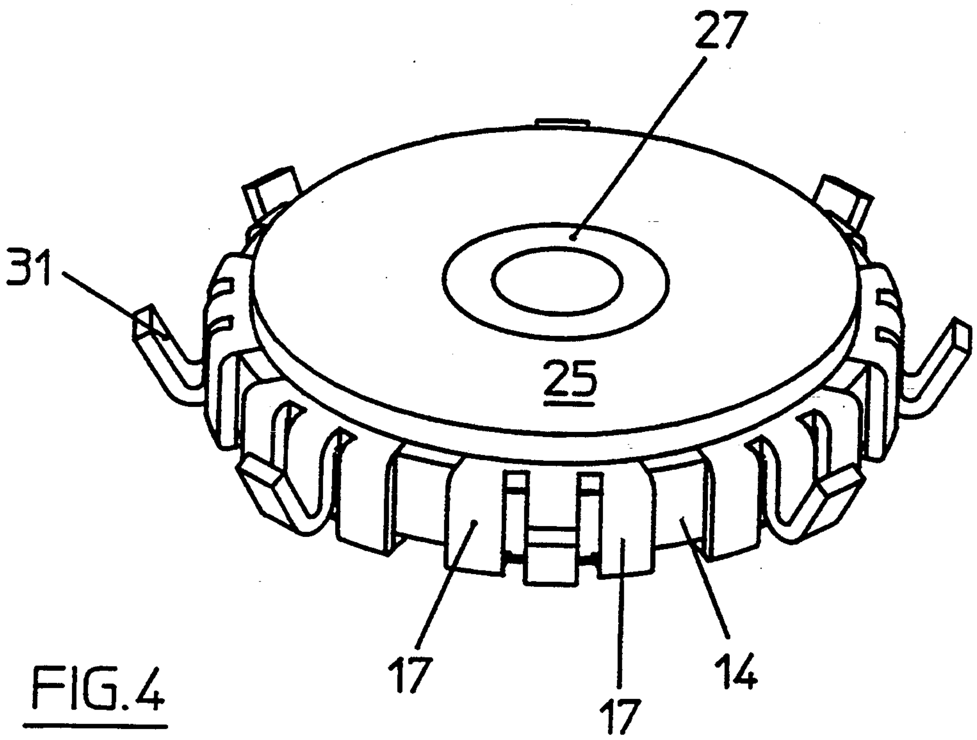
FIG. 4 is a perspective view of the sub-assembly shown in FIG. 3 provided with overmolded carbon forming an outer layer for the formation of carbon segments.
Figure 5:
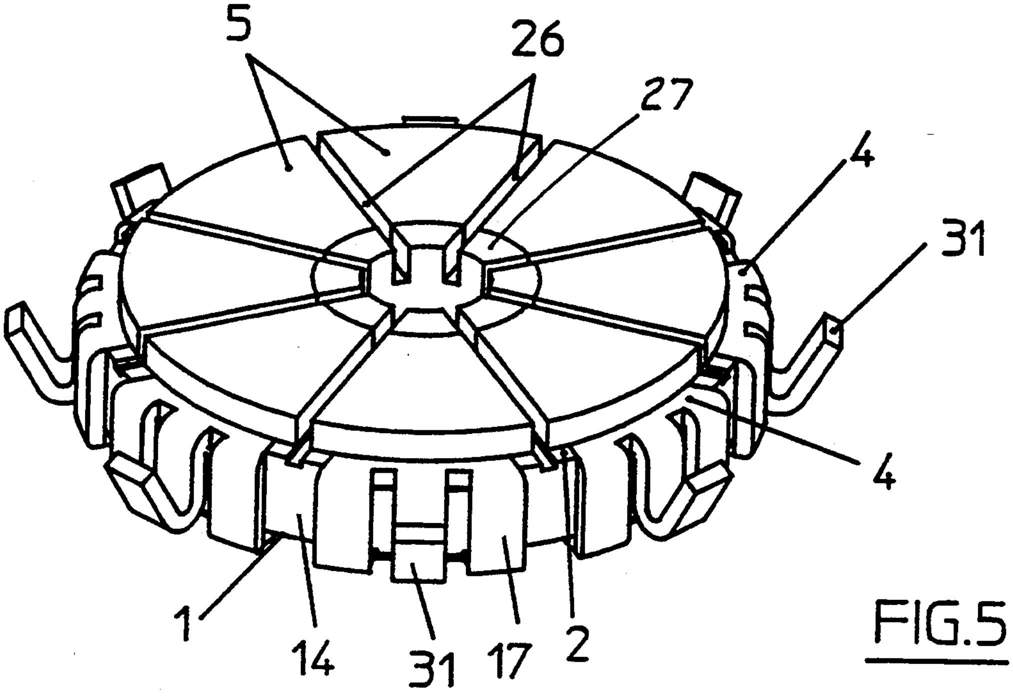
FIGS. 5 and 6 are perspective views of a planar carbon segment commutator, according to the invention, showing, respectively, the front and rear surfaces of the commutator.

The base member 1 and contact members 4 are thus formed separately, assembled together, and then locked together in an overmolding process in which a carbon layer 25, for the carbon segments 5, is formed with integral anchor pieces 6 which hold the carbon layer 25 in place on the base member 1. The carbon layer 25 (FIG. 4) is then separated into segments 5 (FIG. 5) by cutting radial slots 26 which pass right through the carbon layer 25 into the underlying base member 1. As shown in FIG. 5, these slots 26 also pass through the central annular ring 27 and into the strips 2. The segments 5 are therefore circumferentially separated and insulated from each other.

What is claimed is:

1. A planar carbon segment commutator for an electric motor, the commutator comprising:

a base member of insulating material having a rotational axis, a front surface extending, at least in part, transversely to the rotational axis, and a plurality of apertures formed therein and extending rearwardly from the front surface, each aperture provided with a first part and, rearwardly of the first part, with a second part having an abutment surface laterally offset from the first part;

a plurality of circumferentially spaced contact members mounted on the front surface; and a plurality of circumferentially spaced overmolded carbon segments, respectively formed on the contact members, each carbon segment being aligned with a respective aperture and having an integral anchor means which extends rearwardly into its respective aperture and having locking means disposed within the second part of its respective aperture and engaging an abutment surface of its respective aperture to thereby resist axial withdrawal of the anchor means from its respective aperture.

2. A commutator, according to claim 1, in which:

at least one of the apertures extends parallel to the rotational axis and has its second part of greater cross-section than its first part; and each anchor means comprises a single anchor piece extending axially into its respective aperture parallel to the rotational axis.

3. A commutator, according to claim 2, in which:

each aperture has an internal bounding surface extending around a periphery of the aperture;

at least one portion of said bounding surface defines an inwardly directed, peripherally extending projection; and the locking means of the anchor means extending into said aperture have an edge disposed rearwardly of and in axial abutment with the peripherally extending projection.

4. A commutator, according to claim 2 in which:

the base member has side and rear surfaces;

each contact member has a radially outer edge and at least one gripping part; and each gripping part has a first portion extending rearwardly from the radially outer edge of the contact member, along the side surface of the base member, and a second portion extending radially inwards from the first portion, along the rear surface of the base member, to secure the contact member axially to the base member.

5. A commutator, according to claim 1, in which:

the base member is formed with a plurality of axial recesses;

each contact member has at least one rearwardly extending locating portion; and the locating portions are respectively disposed within said axial recesses.

6. A commutator, according to claim 1, in which each contact member has at least one abutment surface facing away from the rotational axis and engaging a respective carbon segment formed on the contact member to resist radial outward movement of the contact member.

7. A commutator, according to claim 6, in which each contact member is formed with at least one hole having an internal bounding surface, a part of which constitutes the abutment surface of the contact member.

8. A commutator according to claim 7, in which each aperture has a third part disposed forwardly of the first part, the third part having a cross-section which fully overlaps each hole formed in its respective contact member, the third part engaging its associated carbon segment.

9. A planar carbon segment commutator for an electric motor, the commutator comprising:

a base member of insulating material having a rotational axis, a front surface extending, at least in part, transversely to the rotational axis, side and rear surfaces, a plurality of axial recesses and a plurality of apertures extending rearwardly from the front surface, each aperture being provided with a first apart, a second part disposed rearwardly of the first part and having an abutment surface laterally offset from the first part, and a third part disposed forwardly of the first part, and each aperture being provided with an internal bounding surface, wherein at least one of the apertures extends parallel to the rotational axis and has its second part of greater cross-section than its first part and one portion of the bounding surface defines an inwardly directed, peripherally extending projection;

a plurality of circumferentially spaced contact members mounted on the front surface of the base member, each contact member being associated with a respective aperture and being formed with at least one rearwardly extending locating portion and at least one hole aligned with the third part of its respective aperture, each contact member having a radially outer edge and at least one gripping part having a first-portion extending rearwardly from the radially outer edge of the contact member, along the side surface of the base member, and a second portion extending radially inwards from the first portion, along the rear surface of the base member, to secure the contact member axially to the base member, wherein the locating portions are disposed within respective axial recesses;

a plurality of circumferentially spaced overmolded carbon segments each associated with a respective contact member and a respective aperture, each carbon segment being formed on its respective contact member and aligned with its respective aperture and each having integral anchor means which extending rearwardly through the at least one hole with the contact member into its respective aperture and having locking means disposed within the second part of its respective aperture and engaging the abutment surface of the second part to thereby resist axial withdrawal of the anchor means, each anchor means being integral with its respective overmolded carbon segment and comprising a single anchor piece and each anchor piece extending axially into its respective aperture extending parallel to the rotational axis, each locking means being disposed within the second part of its respective aperture and having an edge disposed rearwardly of and in axial abutment with the peripherally extending projection of the internal bounding surface of its respective aperture.

* * * * *